Nov. 18, 1924.
J. W. FLOWER
PIPE
Filed Nov. 12, 1921
1,515,853
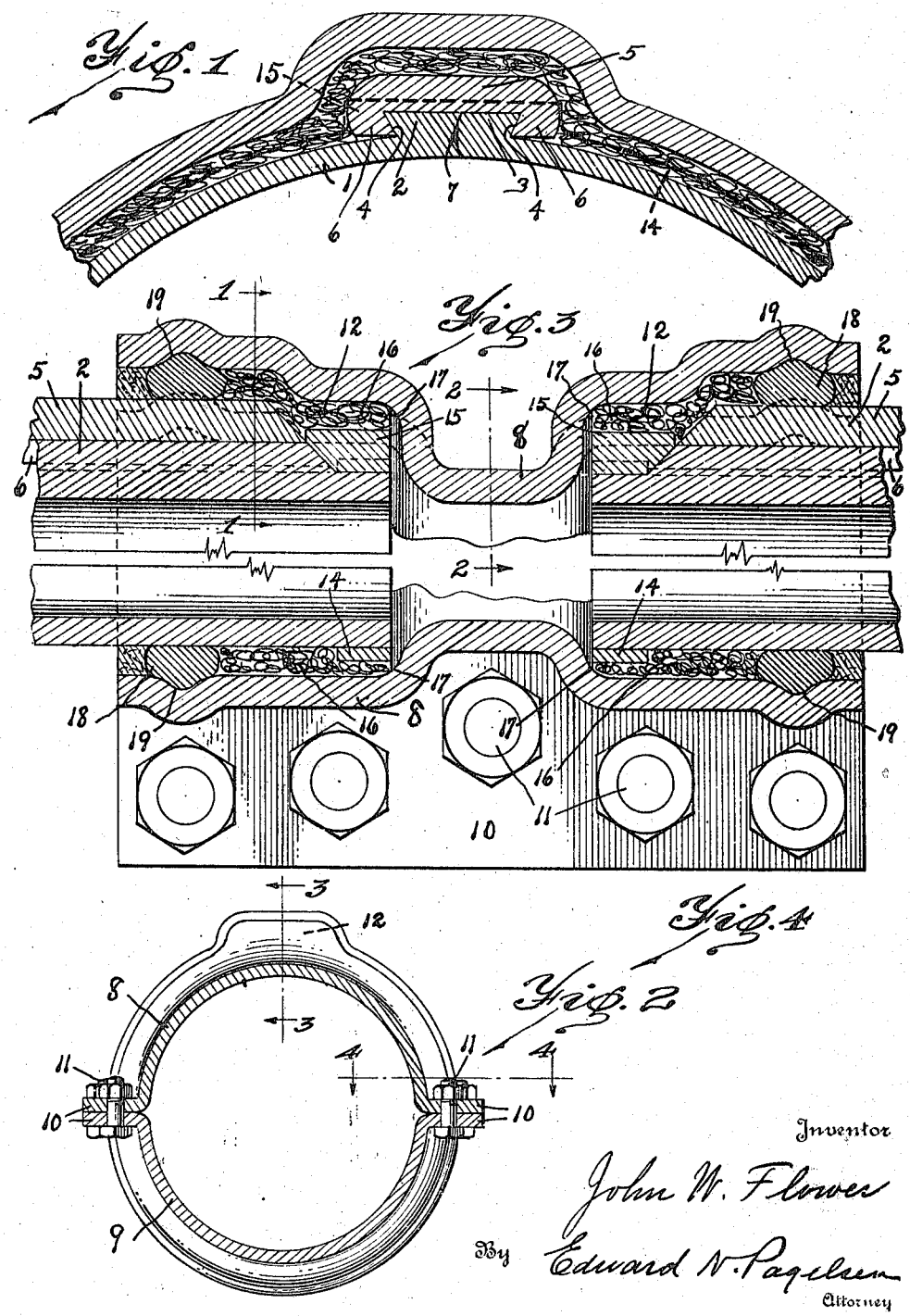
Inventor
John W. Flower
By Edward N. Pagelsen
Attorney Patented Nov. 18, 1924.

1,515,853

UNITED STATES PATENT OFFICE.

JOHN W. FLOWER, OF DETROIT, MICHIGAN, ASSIGNOR, BY MESNE ASSIGNMENTS, TO MICHIGAN VALVE FOUNDRY AND ENGINEERING COMPANY, OF DETROIT, MICHIGAN, A CORPORATION OF MICHIGAN.

PIPE.

Application filed November 12, 1921. Serial No. 514,770.

*To all whom it may concern:*

Be it known that I, JOHN W. FLOWER, a citizen of the United States, and residing at Detroit, in the county of Wayne and State of Michigan, have invented a new and Improved Pipe, of which the following is a specification.

This invention relates to the construction of conduits for conveying water and other liquids under high pressures, and its object is to provide pipes of this character and couplings therefor which can be readily assembled, which will have great strength, and which can be constructed at moderate cost.

This invention consists in a pipe formed of a strip of malleable metal having flanges along its parallel edges, the flanges being on the same side of the strip so that, when the strip is bent to cylindrical form, the tube thus constructed has an external longitudinal rib; and a clamping member extending along this rib and having in-turned flanges to constitute a channel to receive said rib.

It further consists in forming both the rib on the pipe and the channel of the clamping member dovetailed so as to prevent separation thereof.

It also consists in channeling one or both of the abutting edges of the strip which constitutes the pipe to receive the metal wire which is squeezed to the shape of the channel when the clamping bar is applied to the rib on the pipe.

It also consists in metal rings rigidly mounted on the ends of the pipes that extend into the hubs of couplings, valves or other fittings so as to constitute abutments for the caulking materials.

It also consists of the details of construction illustrated in the accompanying drawing and particularly pointed out in the claims.

In the drawing, Fig. 1 is a transverse section on the line 1—1 of Fig. 3, of a portion of pipe showing the joint. Fig. 2 is a section of a coupling on the line 2—2 of Fig. 3. Figs. 3 and 4 are sections on the lines 3—3 and 4—4 of Fig. 2.

Similar reference characters refer to like parts throughout the several views.

The pipe shown in the drawing is preferably rolled from a steel strip having a body 1 provided along its edges with flanges 2 and 3 on one side, which, when the strip is curved to tubular form, constitute a single longitudinal rib on the tube, and the outer edges 4 of this rib preferably flare outwardly as shown in Fig. 1. The edges of the strip are pressed together by a clamping bar consisting of a body 5 and edge flanges 6ª. This bar is rolled with the opposed inner faces of the flanges 6 substantially parallel and after being positioned on the rib on the pipe, the flanges are forced toward each other to conform to the inclined edges 4 of the rib.

Any desired means may be employed to clamp this bar onto the rib, but a heavy press with reciprocating jaws between which the tube and its clamping bar may be fed, is found satisfactory.

One of the contacting edges of the flanges 2 and 3 is preferably grooved and the other edge fits into this groove, leaving a space at the bottom thereof to receive a wire 7 of copper or other soft metal, which is squeezed to fit the two edges when the clamping bar is compressed onto the flanges 2 and 3. As shown in Fig. 1, the groove in one edge of the tube is preferably angular, that is, with straight sides meeting at a line longitudinally of the rib on the pipe, and the other edge is formed to fit therein, leaving a small space in the bottom of the groove.

A coupling for pipe of this character is preferably formed of two parts 8 and 9, each having flanges 10 which receive the bolts 11. These two parts may be press-forged from heavy steel plates and are therefore of great strength. One of the parts is preferably formed with grooves 12 to receive the clamping bars 5.

The clamping bars 5 and the ribs 2 and 3 are preferably beveled off at the ends of the pipes, 2 as shown in Fig. 3, leaving the tubular portion 1 of the pipes. On these ends bands or rings 14 are shrunk to form abutments for the hemp or other packing material 16 usually driven into the spaces between the pipes and the coupling. I prefer to form enlargements 15 on these rings, as indicated by the heavy dotted lines in Fig. 1, and position these enlargements in alinement with the clamping bars 5.

The pipes may be united by couplings in the usual manner, as shown. Hemp or other packing material is driven into the spaces around the ends of the pipes, being held by the shoulders 17 of the coupling and by the rings 14. Rings 18 of lead or other soft metal are then cast in the spaces around the pipes, internal grooves 19 being formed in the coupling for this purpose. These metal rings are then caulked down in the usual manner and a tight joint results.

All the parts are of great strength and the joint of the pipe is absolutely reliable, for the ribs 2 and 3 are produced by the same rolling operation as the middle part which later on forms the tube 1. The clamping bar may be made of any desired thickness so that a pressure of several thousand pounds per square inch can be easily provided for. The constant danger of faulty welding which exists in lapwelded pipe is thus avoided.

The wire 7 in addition to providing for a water-tight joint between the edges of the strips constituting the pipes, also forms a good electric conductor between these ends and thus prevents electrolysis of the pipes which so often results when water pipes parallel street car tracks.

The proportions of the various parts of this pipe and its coupling may all be changed by those skilled in the art without departing from the spirit of my invention as set forth in the following claims.

I claim:—

1. A pipe comprising a tubular body formed by bending a strip of metal to cylindrical form, said strip having flanges along each edge which flanges when brought together form a longitudinal rib on the pipe, and a clamping bar extending along said rib on the pipe and having in-turned flanges engaging the outer edges of the rib on the pipe, the ends of the clamping bar and of the longitudinal rib being cut away at the end of the pipe, and a metal ring secured on the end of the pipe to hold packing when the pipe is inserted within a coupling.

2. A pipe comprising a tubular body formed by bending a strip of metal to cylindrical form, said strip having flanges along each edge which flanges when brought together form a longitudinal rib on the pipe, a clamping bar extending along said rib on the pipe and having in-turned flanges engaging the outer edges of the rib on the pipe, the ends of the clamping bar and of the longitudinal rib being cut away at the end of the pipe, and a metal ring secured on the end of the pipe to hold packing when the pipe is inserted within a coupling, said metal ring having an enlargement in alinement with the clamping bar.

JOHN W. FLOWER.